United States Patent [19]

Harden et al.

[11] Patent Number: 5,229,590
[45] Date of Patent: Jul. 20, 1993

[54] DOME-SHAPED HANDHELD LASER SCANNER

[75] Inventors: Daniel K. Harden; Barbara H. Sauceda, both of Palo Alto, Calif.; Brad R. Reddersen, Eugene, Oreg.; Christopher Lenart, Oakland, Calif.

[73] Assignee: Spectra-Physics Scanning Systems, Inc., Eugene, Oreg.

[21] Appl. No.: 711,524

[22] Filed: Jun. 10, 1991

[51] Int. Cl.$^5$ .............................................. G06K 13/00
[52] U.S. Cl. .................................... 235/472; 250/235
[58] Field of Search ...................... 235/472; 250/235

[56] References Cited

U.S. PATENT DOCUMENTS

| | | | |
|---|---|---|---|
| 4,906,843 | 3/1990 | Jones | 235/472 |
| 4,971,410 | 11/1990 | Wike | 235/472 |
| 5,004,916 | 4/1991 | Collins | 235/472 |
| 5,059,778 | 10/1991 | Zouzoulas | 235/472 |
| 5,136,145 | 8/1992 | Karney | 235/472 |

*Primary Examiner*—Harold Pitts
*Attorney, Agent, or Firm*—Lyon & Lyon

[57] ABSTRACT

A scanner including an oval-shaped handle and a round dome-shaped scanner head with a transparent scanning window above the trigger area of the dome. Markings on top of the scanner to aid with aiming, and a multi-color indicator light on top of the dome.

7 Claims, 1 Drawing Sheet

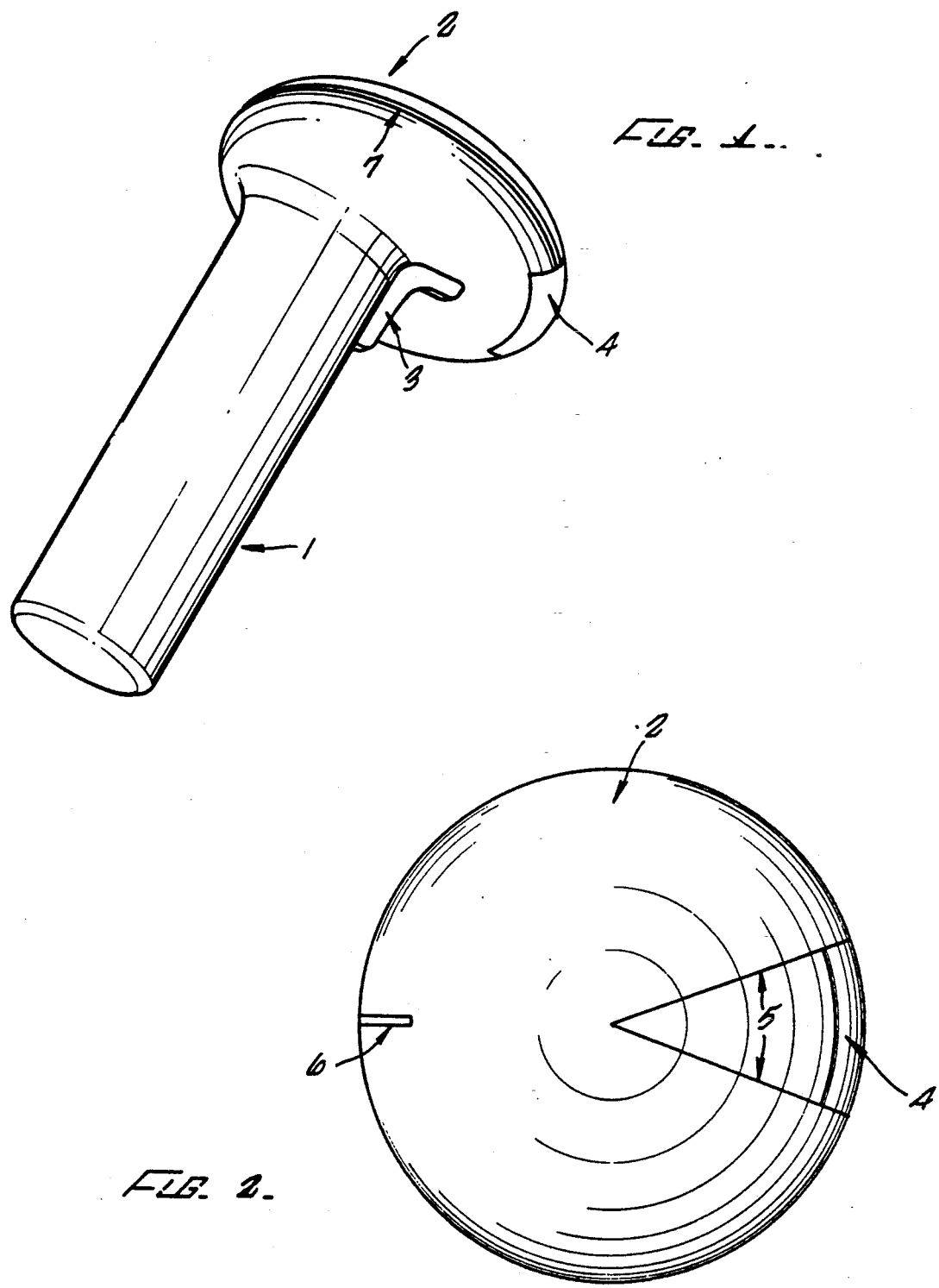

DOME-SHAPED HANDHELD LASER SCANNER

BACKGROUND OF THE INVENTION

The field of the present invention relates to handheld scanners such as for example a laser scanner used to read bar code labels.

SUMMARY OF THE INVENTION

A handheld laser scanner, used for the purpose of non-contact reading of bar codes, emits a scanning line of laser light from an opening on one end of the scanner. The scanner includes a protective housing which incorporates all electronics, optics, light sources, and scanning mechanisms necessary to generate the scanning beam of light, detect the light scattered by the bar code, convert the detected light energy into a digital bit stream, decode the digital information and turn it into a valid bar code, and communicate that information to a data terminal. The scanner includes an oval-shaped handle and a unique round dome-shaped scanner head. This scanner also includes a transparent scanning window above the trigger area of the dome, markings on top of the scanner to aid with aiming, and a multi-color indicator light on top of the dome.

BRIEF DESCRIPTION OF THE DRAWINGS

FIG. 1 is a right side elevation view of a handheld scanner according to the present invention; and FIG. 2 is a top plan view of the handheld scanner of FIG. 1.

DESCRIPTION OF THE PREFERRED EMBODIMENTS

The present invention discloses a new type of handheld laser scanner, with features to make it easier for the scanner manufacturer to assemble the unit as well as easier for the scanner user to actuate, aim, support in the hand, and observe scanner indicator lights during operation.

In one embodiment of the invention, the scanner housing described below will enclose the following parts: a laser light source such as a visible laser diode, a focusing means for the light source, a scanning means for the light source, a means of relaying the scanning beam away from the scanner housing so that it hits a target bar code, a means of collecting the light energy scattered by the bar code, a means of converting that light energy into an analog electronic signal representative of the bar code, a means of converting that analog electronic signal into a digital bit stream, a means of translating the digital bit stream into valid bar code information, a means of formatting the bar code data so that it may be understood properly by a data terminal, a means of communicating with a data terminal, and a means of transmitting the scanned bar code data to the data terminal.

Referring to FIG. 1, the scanner housing 1 consists of several parts. It includes a handle portion 1 which has an oval cross section in the narrow part, and opens up to form a large circular section ending at the seam 7. It also includes a top dome portion 2 and a transparent scanning window 4. This transparent scanning window 4 allows the laser scanning beam to exit from the scanner toward a bar code, as well as to collect the scattered light from the bar code and convert it into valid bar code information.

Mounted on the scanner housing and more or less directly under the scanning window 4 is a trigger 3, which is finger-activated. When pushed, it activates all electronics inside the scanner, so that the laser turns on, the scanning mechanism is set in motion, and all analog detection and digital processing electronics are activated. By pushing the trigger, the scanner can now be used to read labels.

Referring to FIG. 2 the top of the scanner dome 2 includes several other features of importance to this invention. First of all, two aiming lines 5 are painted, molded, or marked in some other way on the top of the dome in a "V" shape as shown on the drawing. These lines touch the edge of the dome at the edges of the transparent scanning window 4. The aiming lines 5 meet at a point which lies on a line running between the center of the scanning window and the center of the dome. Because these lines form a wedge shape which is easily visible to the scanner operator, these aiming lines make it easier for the scanner operator to aim the scanner at the bar code.

The top of the dome 2 also includes a multi-color LED indicator 6 at the rear end of the scanner, and along the same line between the center of the dome and the center of the transparent scanner window 4. This LED indicator 6 can, in one embodiment, glow amber when the trigger is depressed and the laser beam is activated, and then turn green momentarily when a bar code has been read successfully. The LED indicator performs the multiple functions of providing visual feedback to the user as to the status of laser scanning and label decoding.

The LED indicator 6 also provides additional aiming cues for the user in that its linear shape makes it an additional pointer to guide the user to aim the scanner along a line drawn between the LED indicator and the center of the transparent scanning window 4.

The seam 7 between the handle 1 and the top of the dome 2 also provides aiming cues as well, since it is lined up with the center of the outgoing scanning beam.

In one embodiment, the scanner would be assembled with data terminal interface electronics in the handle 1, and all other electronics plus the optomechanical scanning subsystem in the dome portion of the scanner.

One feature of the present invention, as shown in FIG. 1, is the comfortable round shape of the dome portion of the scanner, which allows the scanner to rest comfortably on the hand eve without scanning. This minimizes the fatigue associated with more conventional scanner products.

A second feature of the present invention, as shown in FIG. 2, is the use of the aiming lines 5 as a means of guiding the user to aim the scanner more intuitively in the same direction as the output scanning beam.

A third feature of the present invention, as also shown in FIG. 2, is the positioning of the LED indicator light 6 toward the back of the scanner and on the top of the dome, so that it is easy for the user to see during normal operation.

A fourth feature of the present invention, as also shown in FIG. 2, is the positioning of the LED indicator light 6 in such a way that it can be used as an additional scanner aiming cue by the user.

A fifth feature of the present invention, as also shown in FIG. 1, is the use of the seam 7 between the top of the scanner dome 2 and the handle 1 as an additional scanner aiming cue for the user.

We claim:

1. A handheld scanner comprising: a oval-shaped elongated handle portion and a circular dome-shaped top portion, the handle portion being attached to a bottom surface of the dome-shaped top portion proximate the center thereof, the dome-shaped top portion having an output scanning window through which a scanning beam is emitted, said dome-shaped top portion being of sufficient size with a diameter greater than that of the handle portion so that the dome-shaped top portion rests comfortably on top of a hand of the user even when the user is not scanning.

2. A handheld scanner as described in claim 1 having a V-shaped aiming mark positioned on a top of said dome-shaped top portion with the "V" centered along a centerline passing between the center of said dome-shaped top portion and the center of said output scanning window, with the point of the "V" pointing radially inward and the edges of the "V" lining up on the circular edge of said dome, the V-shaped aiming mark aiding the user in intuitively aiming said scanner at a bar code.

3. A handheld scanner described in claim 1 or 2 having an LED indicator light positioned on an outer edge of said dome-shaped top portion near the rear of said scanner and along a line between the center of said dome and the center of said output scanning window.

4. A handheld scanner as described in any one of claims 1-3, inclusive, having a construction seam running along a top side of said dome-shaped top portion and centered along the same axis as said scanning beam produced by said scanner, said seam being positioned so that it is available to the user as a natural aiming cue to align said scanner with a bar code.

5. A handheld scanner comprising
a round dome-shaped head portion with generally flat top and bottom sides, the dome-shaped head portion having an output scanning window in a front side edge thereof through which a scanning beam may be emitted; and
a downwardly extending elongated handle portion of generally an oval-shaped cross section attached at one end proximate to a center of the bottom side of the dome-shaped head portion,
wherein the dome-shaped head portion being of sufficient size with a diameter greater than that of the handle portion so that the dome-shaped head portion rests comfortably on top of a hand of the user when the user is gripping the scanner.

6. A handheld scanner as described in claim 5 having an aiming mechanism on the top side of the dome-shaped head, comprising
a V-shaped aiming mark positioned with the "V" centered along a diameter of the dome-shaped head portion which bisects the output scanning window, with the point of the "V" pointing radially inward and the edges of the "V" lining up on the circular edge of said dome, the V-shaped aiming mark aiding the user in intuitively aiming the scanner at a bar code and
an LED indicator light positioned on said diameter at a rear edge of the dome-shaped head portion.

7. A handheld scanner as described in claim 6 wherein the aiming mechanism further comprises a construction seam running along the top side of the dome-shaped head portion and centered along said diameter.

* * * * *